United States Patent [19]

Visser

[11] 4,314,660

[45] Feb. 9, 1982

[54] METHOD FOR THE MANUFACTURE OF AXIAL SEALING RINGS

[75] Inventor: Teunis Visser, Sliedrecht, Netherlands

[73] Assignee: IHC Holland N.V., Papendrecht, Netherlands

[21] Appl. No.: 105,529

[22] Filed: Dec. 20, 1979

[51] Int. Cl.³ .............................................. B23K 1/08
[52] U.S. Cl. .................................... 228/140; 277/236
[58] Field of Search .............. 228/140, 135, 139, 165, 228/250; 277/1, 192, 199, 236, 9.5, 81 R

[56] References Cited

FOREIGN PATENT DOCUMENTS 1407413 9/1975 United Kingdom .

Primary Examiner—Eugene F. Desmond
Attorney, Agent, or Firm—Young & Thompson

[57] ABSTRACT

The invention relates to a method of manufacturing large diameter axial sealing rings from hard-metal blocks which are placed in an annular groove said blocks being secured within said groove by filling said groove with liquid solder and circumferentially pressing the radial end faces of the blocks within said liquid solder filled groove against each other by means of radially acting clamp bolts.

1 Claim, 3 Drawing Figures

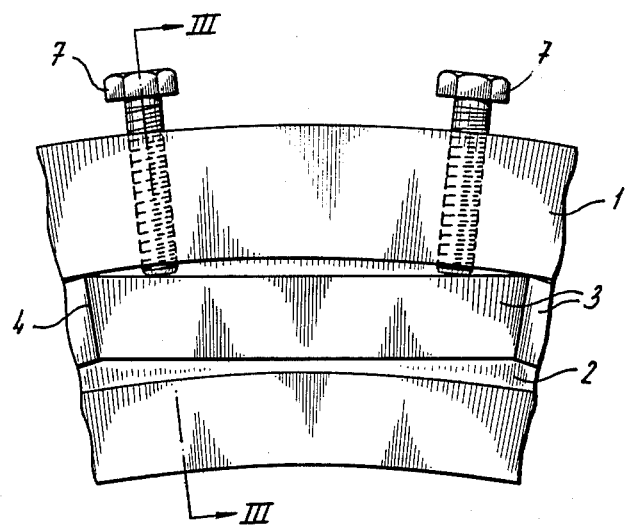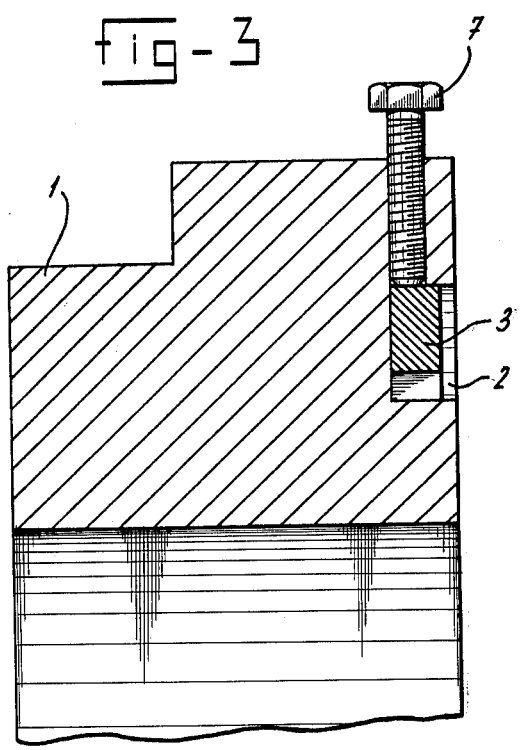

METHOD FOR THE MANUFACTURE OF AXIAL SEALING RINGS

This invention relates to a method for the manufacture of axial sealing rings from hard-metal elements, said elements being disposed in an annular groove of a carrier and being mutually secured and mounted therein by means of a solder.

A method of this kind is known from British Pat. specification No. 1407413. It is being used in particular for large-diameter sealing rings, i.e. sealing rings with a large diameter for the passge of shafts. For this kind of sealing, hard-metal blocks are used, particularly when the seal should be made against liquids containing hard particles. Such sealing rings, particularly of a large diameter, cannot be manufactured in one piece. Consequently, a supporting ring with a groove is used, wherein hard-metal blocks are disposed, said blocks being usually made of sintered material and being made to fit accurately. The blocks are secured by means of a solder, with which they are connected with each other and mounted in the groove of the supporting ring.

Sealing rings obtained in this manner cause problems because the solder between the end faces of the blocks will erode.

It is the object of this invention to provide a method by which a sealing ring is obtained, in which the aforementioned problems will be avoided.

According to the invention, said object is achieved in that in a bath filled with liquefied solder, provided in the groove, the blocks are pressed against each other with their almost radial end faces in the direction of the circumference of the groove by means of radial clamp blts before the solder sets. By radial pressure with clamp bolts, the end faces of the blocks are circumferentially pressed firmly against each other, as a result of which the liquid metal between said end faces is being forced out, i.e. a layer with a minimum thickness remains behind. Sealing rings manufactured in this manner do no longer show the disadvantage that the solder disappears from the end faces facing each other through erosion and that pieces burst off due to stresses created with the known soldering method.

The invention will now be explained more in detail with reference to the accompanying drawings, in which:

FIG. 2 is an elevation at an enlarged scale of part of the ring; and

FIG. 3 is a section on the line III—III of FIG. 2 of the ring.

Figure 1:
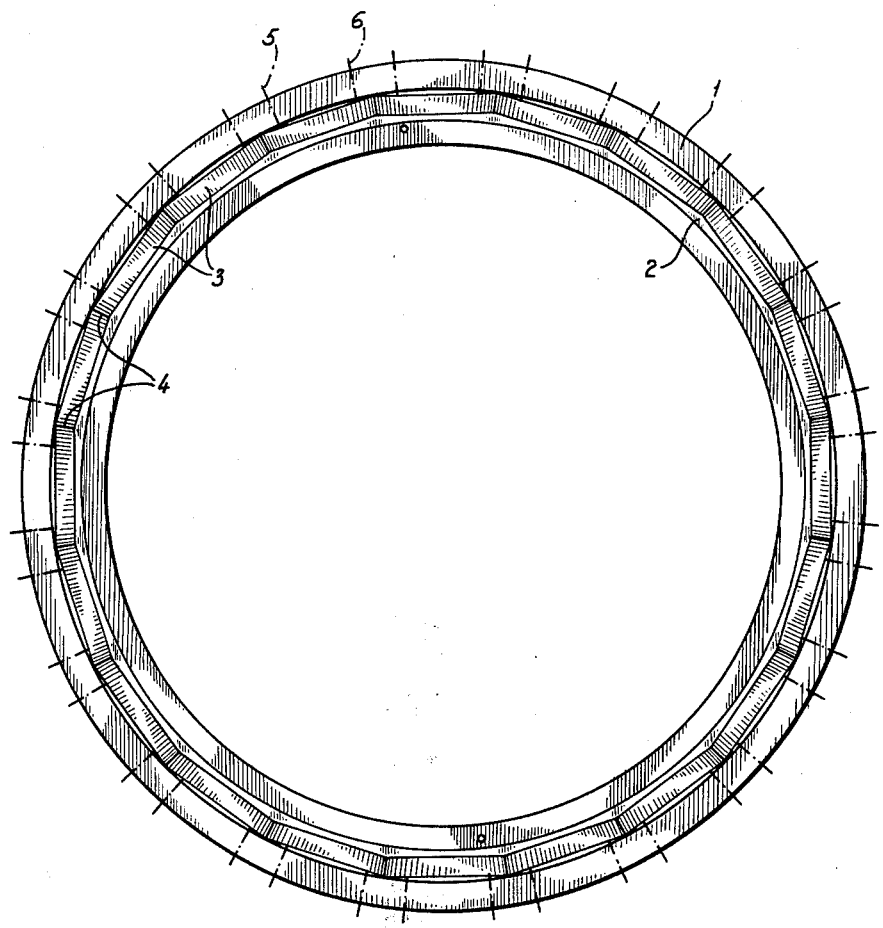
FIG. 1 is a front elevation of a sealing ring obtained by the method according to the invention.

FIG. 1 illustrates a supporting ring 1 with a groove 2 and a continuous row of hard-metal blocks 3 is mounted in said groove, said blocks abutting each other with their radial faces 4.

Bolts 7 are disposed at the region of lines 5 and 6 near each block 3, said bolts acting in radial direction on the blocks 3. When said bolts are tightened inwards, the blocks 3 are pressed against each other in axial direction.

Before this is done, liquid solder has been poured into the groove. Said solder is being squeezed out completely or almost completely from between the contact faces 4.

I claim:

1. Method for the manufacture of axial sealing rings from hard-metal blocks, said blocks being disposed in an annular groove of a carrier and being mutually secured and mounted therein by means of a solder, characterized in that in a bath filled with liquid solder, provided in the groove, the blocks are pressed against each other with their radial end faces in the direction of the circumference of the groove by means of radial clamp bolts before the solder sets.

* * * * *